Patented Aug. 3, 1937

2,088,941

UNITED STATES PATENT OFFICE 2,088,941

AMINO-ALCOHOLS

Max Bockmühl, Gustav Ehrhart, Leonhard Stein, and Julius Hallensleben, Frankfort-on-the-Main, Germany, assignors to Winthrop Chemical Company, Inc., New York, N. Y., a corporation of New York No Drawing. Application June 28, 1935, Serial No. 28,944. In Germany July 5, 1934

4 Claims. (Cl. 260—128.5)

The present invention relates to amino-alcohols, more particularly to amino-alcohols of the following formula:

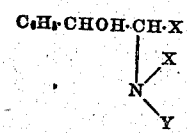

wherein X stands for hydrogen or an alkyl radical, Y for a benzyl radical having one or more etherified or esterified hydroxyl groups as substituents.

These compounds may be produced by reducing the ketones corresponding with the amino-alcohols. This process of reduction proceeds according to the following equation:

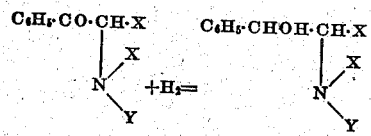

The compounds may also be obtained by introducing into the corresponding amino-alcohols a benzyl radical having as substituents etherified or esterified hydroxyl groups. If desired, the reaction products may be alkylated. The amino-alcohols thus obtained form colorless crystals which are rather sparingly soluble in water and alcohol. They are distinguished by an excellent antispasmodic action on the bronchial spasms, the bile-ducts and the intestine which exceeds greatly that of the known 1-phenyl-2-benzyl-methylaminopropanol.

The following examples serve to illustrate the invention, but they are not intended to limit it thereto:

1. A mixture of 85 grams of 3-methyl-6-methoxybenzylchloride, 165 grams of phenylmethylaminopropanol and 1000 cc. of benzene are heated to boiling in a water bath for some hours. The precipitated phenylmethylaminopropanol hydrochloride is filtered by suction, the benzene solution is neutralized with alcoholic hydrochloric acid and then filtered. The hydrochloride of phenylmethylmethoxymethylbenzylaminopropanol obtained is recrystallized from alcohol. Its melting point lies between 207° C. and 209° C. The yield is almost quantitative. The product obtained has the following formula:

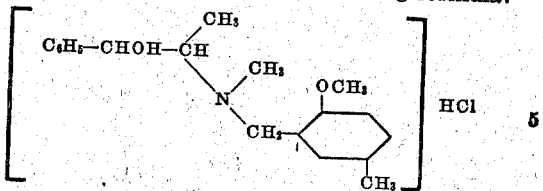

2. 16.5 grams of phenylmethylaminopropanol and 9.5 grams of 3,4-dimethoxybenzylchloride are dissolved in 60 cc. of benzene and the whole is boiled for 5 hours in a reflux apparatus. The hydrochloride of phenylmethylaminopropanol which precipitates on cooling is filtered by suction and subsequently washed with ether. The filtrate obtained is then shaken with about 150 cc. of hydrochloric acid of 10 per cent strength whereby the hydrochloride of 3,4-dimethoxybenzylephedrine separates in an almost quantitative yield. After recrystallization from alcohol the compound melts at a temperature of 213° C. to 214° C. and has the following formula:

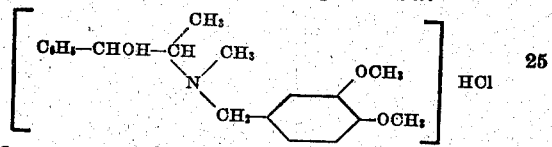

3. 19.5 grams of phenylmethylaminopropanol are dissolved in 75 cc. of benzene and the solution is boiled in a reflux apparatus for 6 hours after addition of 10 grams of 3,4-methylenedihydroxybenzylchloride. The hydrochloride of phenylmethylaminopropanol which crystallizes is filtered by suction and subsequently washed with benzene. From the filtrate the methylenedihydroxybenzene-ephedrine hydrochloride is obtained in an almost quantitative yield by shaking it with dilute hydrochloric acid. The hydrochloride is recrystallized from methanol with addition of ether. The melting point lies between 183° C. and 185° C. The product obtained has the following formula:

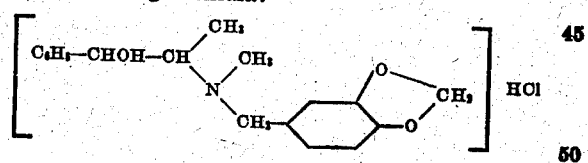

4. 16.5 grams of phenylmethylaminopropanol, 9.5 grams of 3,4-ethylenedihydroxybenzylchloride and 4 times their weight of benzene are heated together to boiling for about 5 hours in a reflux apparatus. The phenylmethylaminopropanol hydrochloride which crystallizes on cooling is filtered by suction and subsequently washed with benzene and ether. The filtrate obtained is shaken with about 150 cc. of hydrochloric acid of 10 per cent strength; after a short time the hydrochloride of ethylenedihydroxybenzyl ephedrine crystallizes from the aqueous solution. After recrystallization the compound melts at a temperature between 198° C. and 200° C. and has the following formula:

$$\left[ C_6H_5-CHOH-CH(CH_3)-N(CH_3)-CH_2-C_6H_3(O-CH_2-O) \right] HCl$$

5. 24.5 grams of 3-carbethoxy-4-methoxybenzylchloride, 33 grams of phenylmethylaminopropanol and 100 cc. of benzene are heated together to boiling for 5 hours in a reflux apparatus. The benzene solution is diluted with ether and the hydrochloride of phenylmethylaminopropanol which separates is filtered with suction and subsequently washed with benzene. The filtrate is shaken with a quantity of hydrochloric acid of 10 per cent strength, sufficient to cause the hydrochloride of the condensation product to separate in the form of an oil. The latter is separated and dissolved in acetone. After a short time the hydrochloride of 3-carbethoxy-4-methoxybenzyl-ephedrine crystallizes from the acetone solution. The compound melts at 178° C. after recrystallization from alcohol and has the following formula:

$$\left[ C_6H_5-CHOH-CH(CH_3)-N(CH_3)-CH_2-C_6H_3(O\cdot COO\cdot C_2H_5)(OCH_3) \right] HCl$$

6. 36 grams of phenylmethylaminopropanol are dissolved in 40 cc. of alcohol and the solution is mixed with 17.5 grams of meta-ethoxybenzylchloride. The whole is heated for a short time and allowed to stand over night. The hydrochloride of phenylmethylaminopropanol formed during the reaction is then precipitated by means of ether, filtered with suction and subsequently washed with ether. The ethereal solution is then shaken with about 150 cc. of hydrochloric acid of 10 per cent strength. The aqueous hydrochloric acid solution is separated and cooled in ice-water. After a short time the hydrochloride of meta-ethoxybenzyl-ephedrine crystallizes which, when recrystallized from acetic ester, melts at a temperature between 168° C. and 170° C. The product has the following formula:

$$\left[ C_6H_5-CHOH-CH(CH_3)-N(CH_3)-CH_2-C_6H_4(OC_2H_5) \right] HCl$$

7. 25.1 grams of phenylmethylaminopropanol and 20 grams of 3-benzyloxy-4-methoxybenzylchloride are dissolved in 65 cc. of benzene and the solution is boiled for 5 hours in a reflux apparatus. After cooling the benzene solution is diluted with ether and the hydrochloride of phenylmethylaminopropanol which separates is filtered with suction and subsequently washed with benzene. The filtrate obtained is shaken with about 100 cc. of dilute hydrochloric acid, the hydrochloride of the condensation product separating in a crystalline form. After recrystallization from alcohol of 96 per cent strength the hydrochloride of 3-benzyloxy-4-methoxybenzyl-ephedrine melts at 188° C. and has the following formula:

$$\left[ C_6H_5-CHOH-CH(CH_3)-N(CH_3)-CH_2-C_6H_3(OCH_2-C_6H_5)(OCH_3) \right] HCl$$

We claim:
1. Amino-alcohols of the following general formula:

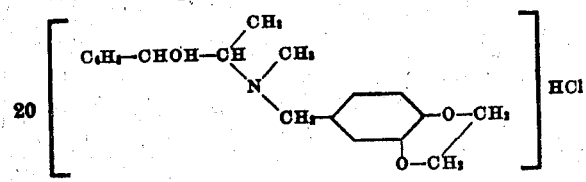

wherein X stands for one of the group consisting of hydrogen and methyl and Y stands for a benzyl radical whose benzene nucleus has attached thereto at least one radical of the group consisting of lower alkoxy, benzyloxy and lower alkylene alpha-omega-dioxy, forming colorless crystals, rather difficultly soluble in water and alcohol.

2. The amino-alcohol of the following formula:

$$\left[ C_6H_5-CHOH-CH(CH_3)-N(CH_3)-CH_2-C_6H_3(OCH_3)(CH_2) \right] HCl$$

forming colorless crystals, rather difficultly soluble in water and alcohol and melting at a temperature of 213° C. to 214° C.

3. The amino-alcohol of the following formula:

$$\left[ C_6H_5-CHOH-CH(CH_3)-N(CH_3)-CH_2-C_6H_4(OC_2H_5) \right] HCl$$

forming colorless crystals, rather difficultly soluble in water and alcohol and melting at a temperature between 207° C. and 209° C.

4. The amino-alcohol of the following formula:

$$\left[ C_6H_5-CHOH-CH(CH_3)-N(CH_3)-CH_2-C_6H_3(OCH_2-C_6H_5)(OCH_3) \right] HCl$$

forming colorless crystals, rather difficultly soluble in water and alcohol and melting at 188° C.

MAX BOCKMÜHL.
GUSTAV EHRHART.
LEONHARD STEIN.
JULIUS HALLENSLEBEN.